United States Patent [19]
Bickel et al.

[11] 3,836,971
[45] Sept. 17, 1974

[54] AIRCRAFT VLF RECEIVING ANTENNA

[75] Inventors: John E. Bickel; Robert J. Gallenberger, both of San Diego, Calif.

[73] Assignee: The United States of America as represented by the Secretary of the Navy, Washington, D.C.

[22] Filed: Feb. 12, 1973

[21] Appl. No.: 331,431

[52] U.S. Cl. ........................................... 343/100 PE
[51] Int. Cl. ............................................. H04b 7/00
[58] Field of Search ....... 343/100 PE; 325/371, 366, 325/367; 235/150.25; 244/3.2

[56] References Cited
UNITED STATES PATENTS
2,991,470  7/1961  George........................... 343/100 PE
3,394,375  7/1968  Vice et al...................... 343/100 PE

*Primary Examiner*—Maynard R. Wilbur
*Assistant Examiner*—T. M. Blum
*Attorney, Agent, or Firm*—R. S. Sciascia; G. J. Rubens

[57] ABSTRACT

Apparatus for receiving the horizontal electric field component of incoming VLF signals to improve airborne communication systems. Vertical antenna elements and horizontal antenna elements are positioned in space quadrature with respect to each other about the fuselage of an aircraft to receive the vertical component and noise, and the horizontal component, respectively, when the aircraft is flying level. Vertically polarized signal and noise received by the two antennas when the aircraft bank angle and pitch are not zero are subtracted from the output of the horizontal antenna elements.

4 Claims, 7 Drawing Figures

PATENTED SEP 17 1974						3,836,971

AIRCRAFT VLF RECEIVING ANTENNA

BACKGROUND

U. S. Navy research into VLF/LF propagation phenomena has indicated, inter alia, that under certain propagation conditions the magnitude of the horizontal electric field component of VLF received signals can exceed that of the vertical component at aircraft altitudes even when excited by a vertical radiator. The above is most likely to occur for night-time propagation and at distances where modal interference phenomena produces a minimum for one condition and a maximum for another. Furthermore, elevated and predominantly horizontal radiators can excite higher horizontal fields than vertical radiators. It can thus be appreciated that VLF/LF communication to aircraft can be improved if horizontal or vertical receiving antennas are used at the elevated position.

The Navy studies have also revealed that significant improvement in operation of communication systems can be realized by using horizontal receiving antennas due the lower magnitude of horizontally polarized atmospheric noise and resulting increase in signal-to-noise ratio.

SUMMARY OF THE INVENTION

Apparatus are disclosed for enabling VLF communication to aircraft by means of the horizontally polarized electric field component of a received VLF signal. Vertical receiving dipole elements and a plurality of horizontal receiving dipole elements are positioned in space-quadrature with respect to each other about the frame and wings of an aircraft. The respective outputs of the antennas are combined such that a first output is produced comprising the vertical components of the signal and noise received by the vertical elements, and a second output is also produced comprising only the horizontal electric field when the aircraft is banked or flying level, its phase being independent of the aircraft heading. The vertically polarized signal and noise which is received when the bank angle or aircraft inclination is not zero is subtracted from the output of the horizontal elements to produce an output comprising essentially the horizontal electric field component which has a low magnitude of horizontally polarized noise and hence may have a higher signal-to-noise (S/N) ratio than the vertical component whereby VLF communication performance effectiveness can be achieved.

OBJECTS

It is the primary object of the present invention to provide receiving antenna apparatus for use in airborne, VLF communication systems and which can improve the performance thereof by enabling the use of the horizontal electric field component of received VLF signals for communication purposes.

Other objects, advantages and novel features of the invention will become apparent from the following detailed description of the invention when considered in conjunction with the accompanying drawings.

DESCRIPTION OF THE PREFERRED EMBODIMENT

The novel concept to be disclosed herein essentially comprises the use of vertically and horizontally polarized aircraft receiving antennas to couple to the horizontal electrical field component in addition to the vertical polarized field component of received VLF signals to improve communication system performance by virtue of the higher S/N ratio associated therewith.

Figure 1A:
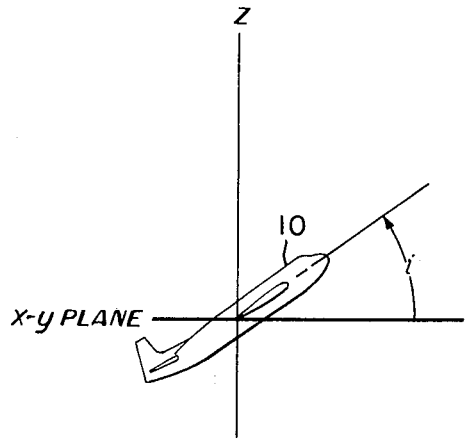
FIGS. 1(a), (b), and (c), are illustrations of aircraft pitch (inclination), roll (bank), and heading with respect to a three-dimensional x-y-z plane.
Figure 1B:
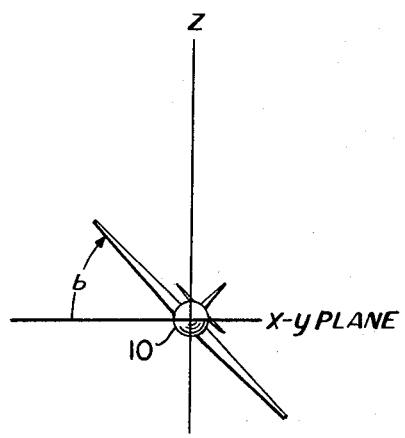
Figure 1C:
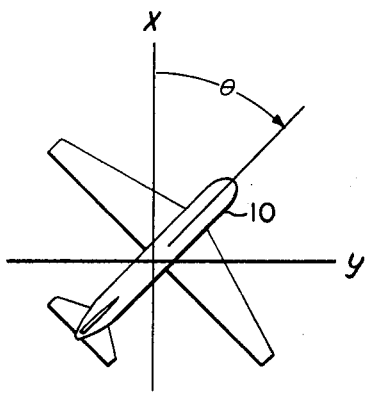

FIGS. 1(a), (b), and (c) depict graphically the angles of pitch (inclination), roll (bank), and heading for an aircraft 10 with respect to a three-dimensional x-y-z axis system. Specifically, FIG. 1(a) shows the pitch angle i which is measured from the aircraft to x-y plane; FIG. 1(b) shows the bank angle b which is measured from the aircraft as shown to the x-y plane; and FIG. 1(c) shows the heading angle $\theta$ which is measured between the aircraft and the x-axis.

Figure 2:
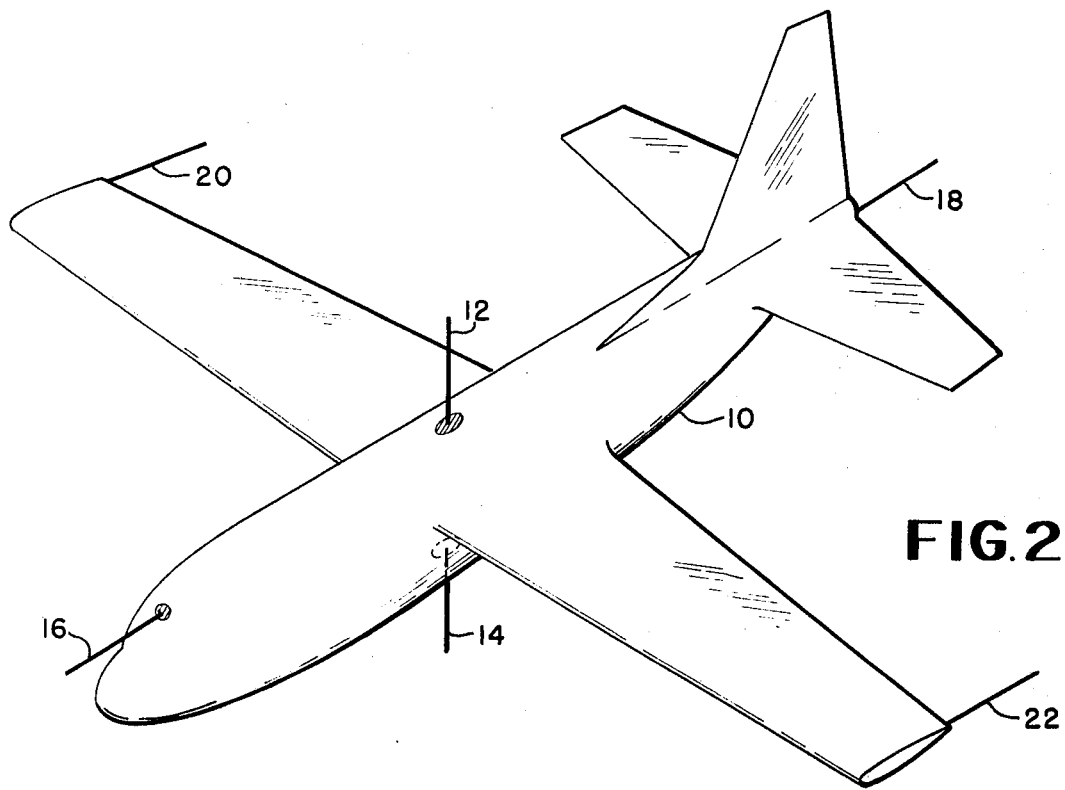
FIG. 2 is an isometric view of vertical antenna elements and horizontal antenna elements positioned in space quadrature with respect to each other about an aircraft.

FIG. 2 illustrates a possible configuration of vertical and horizontal antenna elements about the aircraft 10 in accordance with the inventive concept to be disclosed herein. The antennas comprise two vertically polarized antennas 12 and 14 which are located on the top and bottom of approximately the center of the aircraft fuselage, respectively. Two associated, horizontally polarized antennas 16 and 18 are located fore and aft of the aircraft fuselage, respectively; and two more assocated horizontal antennas are located at the end of the right and left wings, respectively.

The antennas should be physically small due to aircraft mounting limitations. For example, short, steel rods, can be readily utilized as the antenna elements as shown in FIG. 2. The effective height of the vertical antennas 12 and 14 presents no problem since the field strength of the vertical noise field is relatively large and atmospheric, noise-limited, vertical, VLF receiving systems are common.

The effective length of the horizontal antenna elements 16 and 18, and 20 and 22 must be relatively large because the magnitude of horizontal noise is very low, especially for lower altitudes and during daytime, and so that received atmospheric noise voltage overcomes the high thermal noise levels associated with electrically short, high-impedance antennas.

As stated previously, the antenna elements can comprise steel rod antenna elements which can be screwed into an insulator mounted in the end of a short section of aluminum pipe which also can contain the other electrical circuitry.

Figure 3:
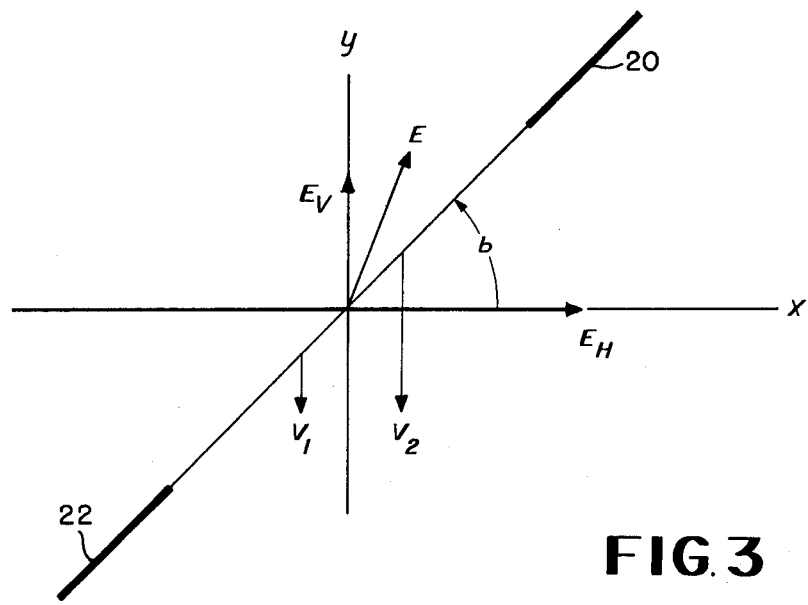
FIG. 3 is an illustration of the geometry associated with a horizontal antenna element pair in an arbitrarily polarized field.

The field theory embodied in the concept is disclosed herein briefly and comprises the following with respect to the orientation of the elements and field shown in FIG. 3. In the figure, one of the pairs of antenna elements, 20 and 22, are shown immersed in a horizontal electric field $E_H$, whereby $V_1$ and $V_2$, the outputs of the elements, are in phase opposition.

Thus, if,
$v_2 = V_2 \cos \omega t$
then
$v_1 = -V_1 \cos \omega t$
and
$v_2 - v_1 = (V_2 + V_1) \cos \omega t$ The resultant output amplitude is the sum of the component amplitudes, which are dependent, in part, upon antenna element length, antenna base separation, and preamplifier gain.

The voltage output of the horizontal antennas in the more general case can be derived from an analysis of FIG. 3 wherein an electric field E with arbitrary polarization is received by the antennas 20 and 22. The field has a component $E_r$ in the vertical plane and a component $E_H$ in the horizontal plane, and the antennas are inclined at a bank angle b from the horizontal plane.

The time variation of the signal is as follows:
$E_x = E_H \cos \omega t$
$E_y = E_r \cos (\omega t + \phi)$
where $\phi$ is the time angle between the two components.

Let $K_1$ = effective length of 20
$K_2$ = effective length of 22
$G_1$ = gain of amplifier
$G_2$ = gain of amplifier
Then
$v_2 = K_2 G_2 E_r \sin b \cos (\omega t + \phi) + K_2 G_2 E_H \cos b \cos \omega t$
$v_1 = K_1 G_1 E_r \sin b \cos (\omega t + \phi) - K_1 G_1 E_H \cos b \cos \omega t$
The output of the combiner 21 is thus
$V_H = V_2 - V_1 = (K_2 G_2 + K_1 G_1) [E_r \sin b \cos (\omega t + \phi) + E_H \cos b \cos \omega t]$
If $K_1 = K_2 = K$, and if $G_1 = G_2 = G$,
then
$V_H = 2KG [E_r \sin b \cos (\omega t + \phi) + E_H \cos b \cos \omega t]$ Therefore, if the bank angle b equals zero, the voltage $V_H$ is proportional to only the horizontal component of the incident field since sin 0° = 0.

Figure 4:
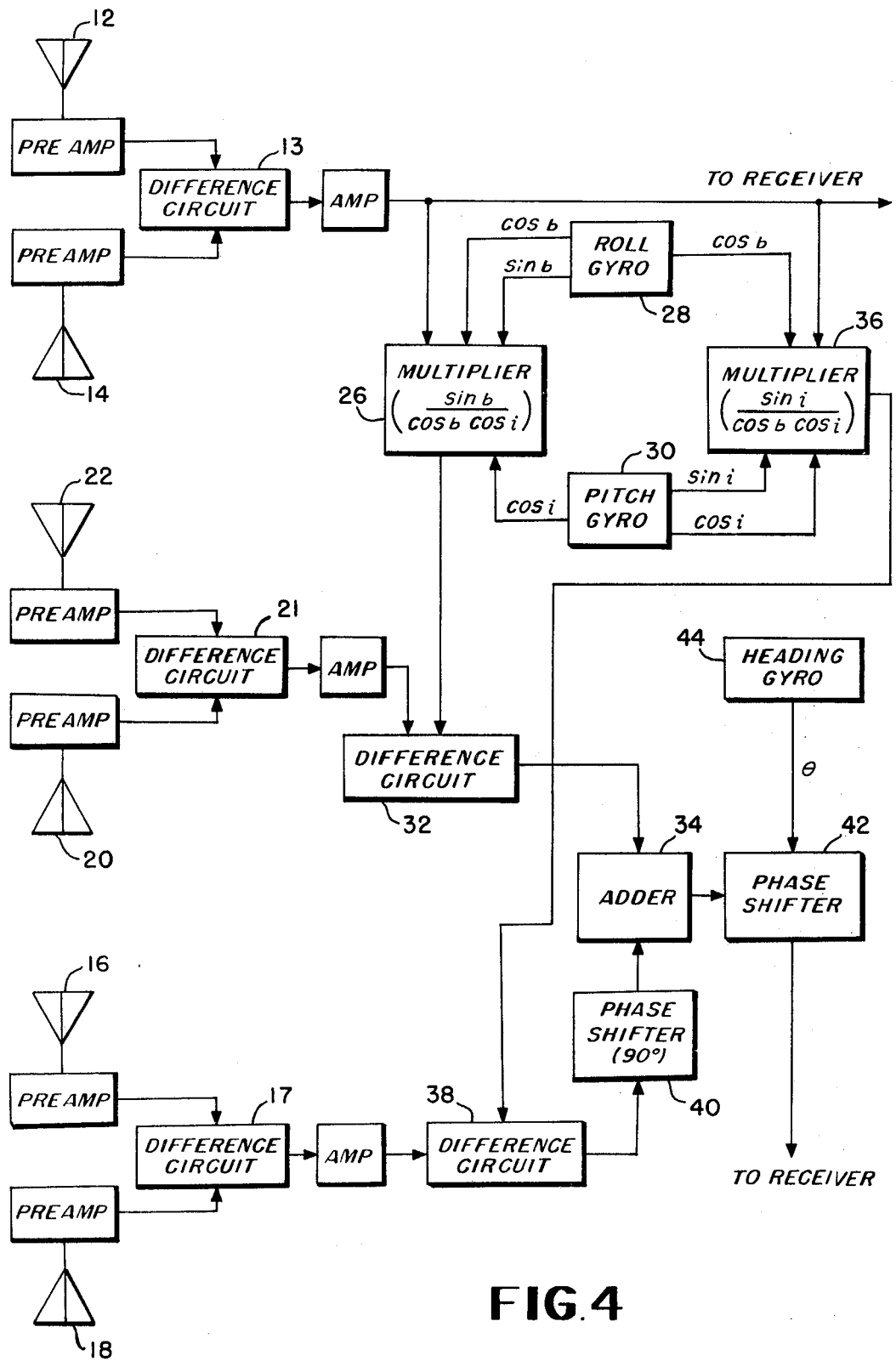
FIG. 4 is a simplified electrical block diagram of the antenna elements and the novel circuitry for producing a signal proportional to the horizontal electric field component independent of the aircraft attitude; and, FIG. 5 is an electrical schematic drawing of an embodiment of one of the antenna element pairs and its associated combiner or "difference circuit" as shown in FIG. 4.

Accordingly, the apparatus of FIG. 4 embodies the above inventive concept. In the Figure, the three antenna pairs 12 and 14, 16 and 18, and 20 and 22 are shown connected to electrical circuitry for receiving incoming VLF signals and for producing the horizontal component thereof.

The outputs from the two vertical antennas 12 and 14 are combined in the signal combiner 13, outputs from the two horizontal antenna pairs 16–18 and 20–22 are likewise combined in their respective combiners 17 and 21.

Figure 5:
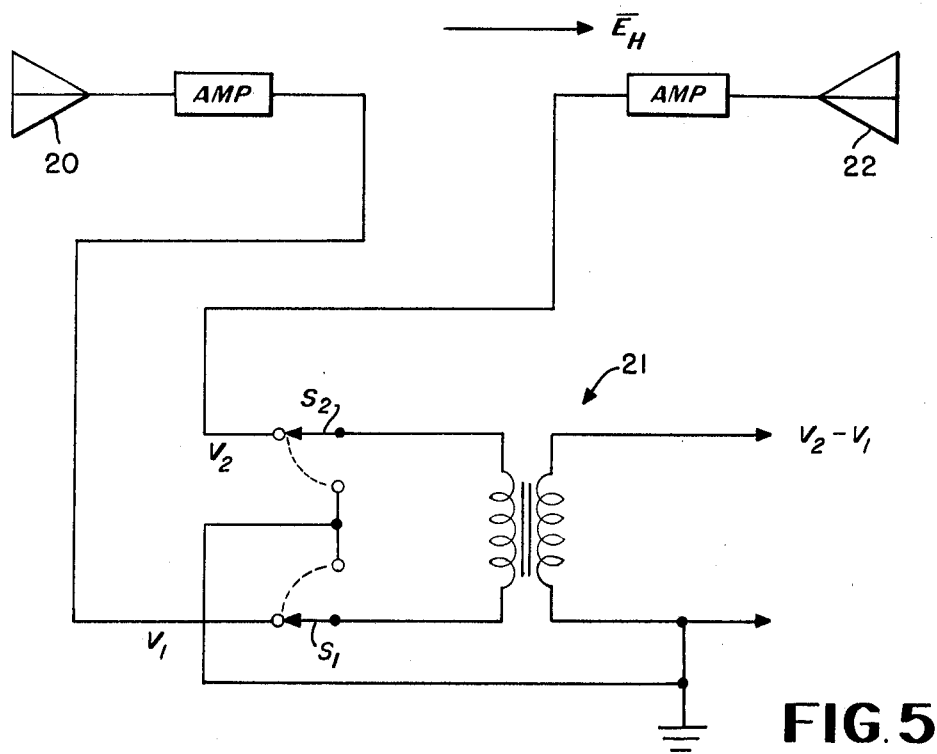

The horizontal-antenna system comprising the two antennas 20 and 22 and the signal combiner or difference circuit 21 are shown in FIG. 5 for exemplary purposes, the system being identical to the other two antenna systems. The signal combiner comprises a 1:1 transformer which when driven by the two input signals $V_1$ and $V_2$, as shown, produces an output signal equal to $V_2 - V_1$. The switches $S_1$ and $S_2$ allow measurement of $V_1$ and $V_2$ separately by grounding the opposite side of the transformer of 21.

The output $V_r$ of the combiner 13 is fed directly to receiver (not shown) and also to the multiplier 26. The multiplier receives inputs cos b and sin b from the roll or bank angle gyro unit 28, and input cos i from the pitch or inclination gyro unit 30.

The vertical output, $V_r$, is approximately equal to $V_r \approx E_r \cos b \cos i$; the horizontal output, $V_H$, is approximately equal to $V_H \approx E_H \cos b + E_r \sin b$. But since $E_r \sin b = V_r (\sin b)/(\cos b \cos i) = (E_r \cos b \cos i)(\sin b)/(\cos b \cos i)$, $V_H$ can be made substantially equal to $E_H \cos b$ by subtracting $E_r \sin b$ from $V_H$.

The above is thus accomplished by multiplying $E_r$ by the term sin b/cos b cos i in the analog multiplier 26.

Accordingly, the output of the multiplier 26 is subtracted by 32 from the output of the combiner 21 to produce at the output of 32 a voltage proportional to only horizontally polarized signal (and noise).

In a similar manner, the vertical signal and noise received by the fore and aft antenna system 16, 17, and 18 is subtracted from the output of their combiner 17. The subtraction is performed by the subtraction circuit 38 which receives an input from the multiplier circuit 36 which multiplies the output $V_r$ by (sin i/cos b cos i). Thus, the output of 38 also comprises pure horizontal signal and noise.

The horizontal output from 32 is coupled to the adder 34, as is the horizontal output from 38; however, this output is first phase shifted 90° in 40 so that the voltage from 34 is independent of the heading angle, $\theta$, of the aircraft with respect to the direction of arrival of the VLF/LF radio signal.

The output of the adder 34 is then phase shifted in 42 by an amount equal to $\theta$ the heading angle. The phase shifter 42 is driven by an input from the gyro unit 44.

Consequently, the output from 42 comprises pure, horizontally polarized signal and noise and its magnitude and phase are independent of the aircraft bank angle (roll), fuselage inclination (pitch), and heading angle $\theta$.

Obviously many modifications and variations of the present invention are possible in the light of the above teachings. It is therefore to be understood that within the scope of the appended claims the invention may be practiced otherwise than as specifically described. For example, a horizontal loop antenna could be used to receive the horizontal signal instead of the two horizontal antenna pairs.

What is claimed is:

1. Aircraft antenna apparatus for receiving VLF signals comprising:

vertically-polarized antenna means symmetrically positioned on the top and bottom of the fuselage portion of an aircraft and being perpendicular to the centerline of said fuselage relative to the front and tail-end thereof for producing an output signal comprising vertically-polarized signal and noise;

first horizontally-polarized antenna means symmetrically positioned near the end of both wings of said aircraft and being in space-quadrature with respect to said vertically-polarized antenna means for producing an output comprising horizontally-polarized signal, vertically-polarized signal, and noise;

second horizontally-polarized antenna means symmetrically positioned at said front and tail end and being in space-quadrature with respect to said vertically-polarized antenna means for producing an output comprising horizontally-polarized signal, vertically-polarized signal, and noise;

bank angle gyro means mounted on said aircraft for providing signals equal to cos $b$ and sin $b$, where $b$ is equal to the bank angle of said aircraft;

pitch angle gyro means mounted on said aircraft for providing signals equal to cos $i$ and sin $i$, where $i$ is equal to the pitch angle of said aircraft;

signal multiplier means connected to the output of said vertically-polarized antenna means and to the outputs of said bank angle gyro means and said pitch angle gyro means to produce a first product output equal to said output signal times the ratio (sin $i$/cos $b$ cos $i$), and a second product output equal to said output signal times the ratio (sin $b$/cos $b$ cos $i$);

first signal combiner means connected to the output of said first horizontally-polarized antenna means and to the output of said signal multiplier means for subtracting said first product output from the output of said first horizontally-polarized antenna means and to thereby produce a first horizontally-polarized output substantially free of all vertically polarized signal and noise;

second signal combiner means connected to the output of said second horizontally-polarized antenna means and to the output of said signal multiplier means for subtracting said second product output from the output of said second horizontally-polarized antenna means and to thereby produce a second horizontally-polarized output substantially free of all vertically-polarized signal and noise;

first phase shifter means connected to the output of said first signal combiner means for shifting the phase of said first horizontally-polarized output by 90°;

signal adder means connected to the outputs of said second signal combiner means and said first phase shifter means to produce a combined output comprising only horizontally-polarized signal and noise; and, second phase shifter means connected to the output of said signal combiner means for shifting the phase of said combined output by an amount proportional to the heading angle of said aircraft.

2. The apparatus of claim 1 wherein said vertically-polarized antenna means, said first horizontally-polarized antenna means, and said second horizontally-polarized antenna means, each comprise a pair of steel-rod dipole antennas.

3. The apparatus of claim 1 wherein said second phase shifter means includes heading gyro means.

4. Airborne antenna means for receiving horizontally polarized VLF signals comprising:

vertically polarized antenna means and horizontally polarized antenna means positioned about an aircraft in space-quadrature with respect to each other for receiving VLF signals;

signal multiplier means connected to the output of said vertically-polarized antenna means;

pitch and bank gyro means further connected at their outputs to said multiplier means for producing an output product signal substantially equal to the vertically-polarized signal and noise received by said horizontally polarized antenna means when the pitch and bank angles of said aircraft are not zero; and, signal combiner means connected to the output of said horizontally-polarized antenna means and said signal multiplier means to subtract its output signal from the signal and noise received by said horizontally polarized antenna and to thereby provide an output signal comprising only horizontally polarized signal.

* * * * *